(12) United States Patent
Widman et al.

(10) Patent No.: US 8,953,176 B2
(45) Date of Patent: Feb. 10, 2015

(54) LASER CONFOCAL SENSOR METROLOGY SYSTEM

(71) Applicant: Johnson & Johnson Vision Care, Inc., Jacksonville, FL (US)

(72) Inventors: Michael F Widman, Jacksonville, FL (US); John B Enns, I, Jacksonville, FL (US); P Mark Powell, Jacksonville, FL (US); Peter W Sites, Orange Park, FL (US); Christopher Wildsmith, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 14/058,143

(22) Filed: Oct. 18, 2013

(65) Prior Publication Data

US 2014/0063486 A1    Mar. 6, 2014

Related U.S. Application Data

(63) Continuation of application No. 13/305,655, filed on Nov. 28, 2011, now abandoned.

(60) Provisional application No. 61/418,148, filed on Nov. 30, 2010.

(51) Int. Cl.
*G01B 11/14* (2006.01)
*G01M 11/02* (2006.01)
*G01B 11/24* (2006.01)
*G01B 11/06* (2006.01)

(52) U.S. Cl.
CPC .......... *G01M 11/02* (2013.01); *G01M 11/0214* (2013.01); *G01B 11/24* (2013.01); *G01M 11/025* (2013.01); *G01M 11/0242* (2013.01); *G01B 11/06* (2013.01); *G01M 11/0207* (2013.01)
USPC .......................................... 356/624; 356/622

(58) Field of Classification Search
USPC ......... 356/614–615, 619–624, 630, 124–128, 356/400, 399–401, 632; 82/1.11, 12; 382/141, 131
See application file for complete search history.

(56) References Cited

U.S. PATENT DOCUMENTS

| 3,804,523 | A | 4/1974 | McCormack |
| 4,403,420 | A | 9/1983 | Rarick |
| 5,024,527 | A | 6/1991 | Harrison |
| 5,280,336 | A | 1/1994 | Fantone et al. |
| 5,500,732 | A | 3/1996 | Ebel et al. |

(Continued)

FOREIGN PATENT DOCUMENTS

| DE | 3934744 A1 | 4/1991 |
| DE | 19806446 A1 | 8/1999 |

(Continued)

OTHER PUBLICATIONS

PCT International Search Report, dated Mar. 19, 2012, for PCT Int'l Appln. No. PCT/US2011/062403.

(Continued)

*Primary Examiner* — Tri T Ton

(57) ABSTRACT

The present invention provides apparatus for a non-contact method of obtaining accurate three-dimensional measurements of a dry contact lens, more specifically, using dry lens metrology to know the exact thickness of a contact lens.

6 Claims, 8 Drawing Sheets

(56) References Cited

U.S. PATENT DOCUMENTS

| | | |
|---|---|---|
| 5,717,781 A | 2/1998 | Ebel et al. |
| 5,812,254 A | 9/1998 | Ebel et al. |
| 6,937,328 B2 | 8/2005 | Fukuma et al. |
| 7,433,027 B2 | 10/2008 | Hall |
| 2008/0052194 A1 | 2/2008 | Shinohara et al. |
| 2011/0116081 A1 | 5/2011 | Sugimoto |

FOREIGN PATENT DOCUMENTS

| | | |
|---|---|---|
| EP | 0357905 A2 | 3/1990 |
| EP | 0769689 A2 | 4/1997 |
| EP | 0890414 A2 | 1/1999 |
| EP | 2048472 A1 | 4/2009 |
| FR | 2251021 | 6/1975 |
| GB | 2278193 A | 11/1994 |
| GB | 2337815 A | 12/1999 |
| JP | 2003279440 A1 | 10/2003 |
| WO | WO 8802846 A1 | 4/1988 |
| WO | WO 2007018118 A1 | 2/2007 |
| WO | WO 2008052701 A1 | 5/2008 |

OTHER PUBLICATIONS

PCT International Search Report, dated Mar. 16, 2012, for PCT Int'l Appln. No. PCT/US2011/062408.

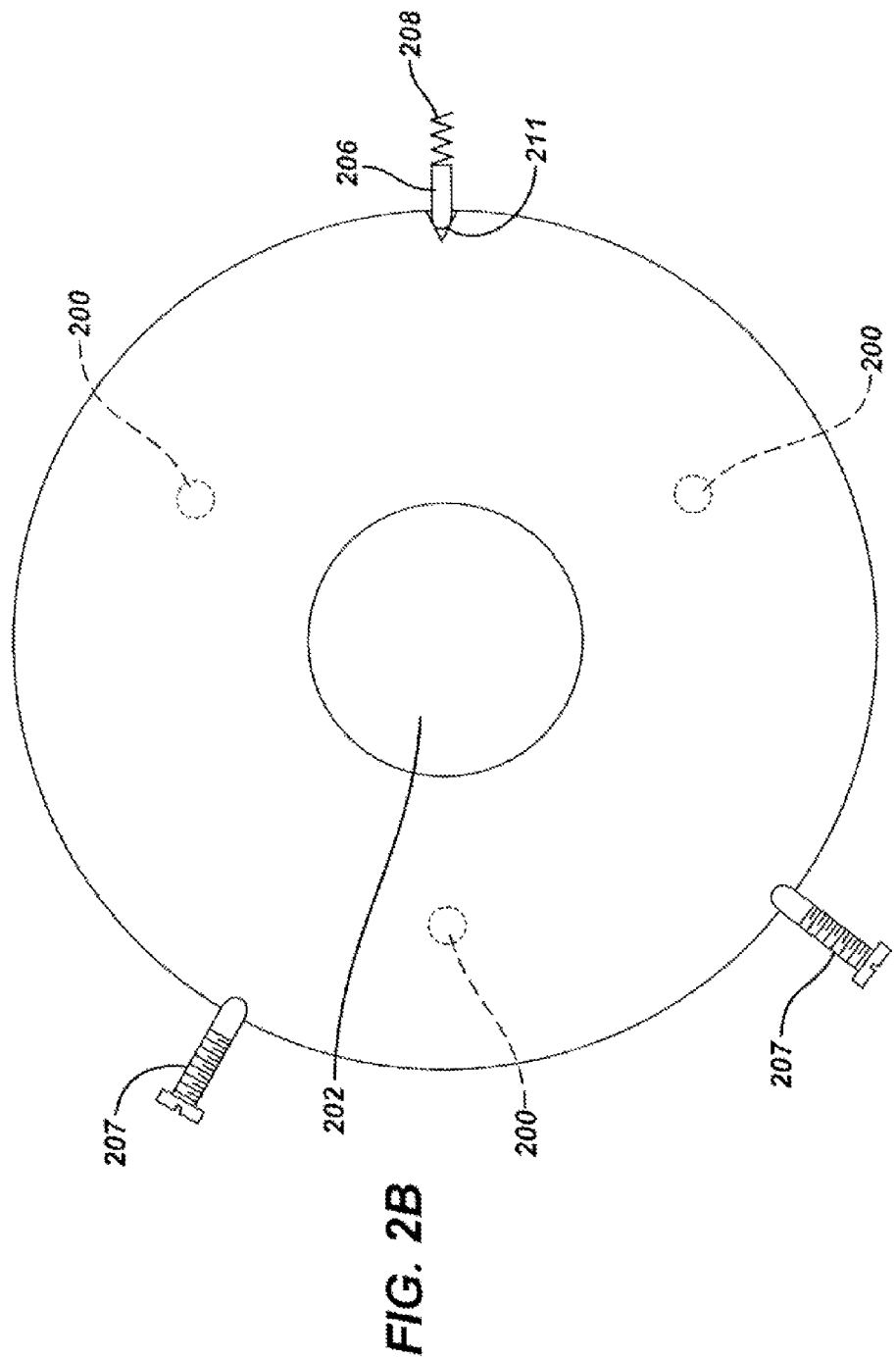

LASER CONFOCAL SENSOR METROLOGY SYSTEM

RELATED APPLICATIONS

This application claims priority to U.S. patent application Ser. No. 13/305,655 which was filed on Nov. 28, 2011; and U.S. Provisional Patent Application Ser. No. 61/418,148 which was filed on Nov. 30, 2010, the contents of which are relied upon and incorporated by reference.

FIELD OF USE

This invention describes apparatus for a non-contact method of obtaining accurate three-dimensional measurements of a dry contact lens, more specifically, using dry lens metrology to know the exact thickness of a contact lens.

BACKGROUND OF THE INVENTION

Ophthalmic lenses are often made by cast molding, in which a monomer material is deposited in a cavity defined between optical surfaces of opposing mold parts. Multi-part molds used to fashion hydrogels into a useful article, such as an ophthalmic lens, may include for example, a first mold part with a convex portion that corresponds with a back curve of an ophthalmic lens and a second mold part with a concave portion that corresponds with a front curve of the ophthalmic lens. To prepare a lens using such mold parts, an uncured hydrogel lens formulation is placed between a plastic disposable front curve mold part and a plastic disposable back curve mold part.

The front curve mold part and the back curve mold part are typically formed via injection molding techniques wherein melted plastic is forced into highly machined steel tooling with at least one surface of optical quality.

The front curve and back curve mold parts are brought together to shape the lens according to desired lens parameters. The lens formulation was subsequently cured, for example by exposure to heat and light, thereby forming a lens. Following cure, the mold parts are separated and the lens is removed from the mold parts.

Cast molding of ophthalmic lenses has been particularly successful for high volume runs of a limited number of lens sizes and powers. However, the nature of the injection molding processes and equipment make it difficult to form custom lenses specific to a particular patient's eye or a particular application. Consequently, other techniques have been explored, such as: lathing a lens button and stereo lithography techniques. However, lathing requires a high modulus lens material is time consuming and limited in the scope of the surface available and stereo lithography has not yielded a lens suitable for human use.

In prior descriptions, methods and apparatus for forming customized lenses via the use of voxel based lithographic techniques have been described. An important aspect of these techniques is that a lens is produced in a novel manner where one of two lens surfaces is formed in a free form fashion without cast molding, lathing or other tooling. A free formed surface and base may include a free flowing fluent media included in the free formed surface. This combination results in a device sometimes referred to as a Lens Precursor. Fixing radiation and hydration treatments may typically be utilized to convert a Lens Precursor into an ophthalmic lens.

A freeform lens created in this manner may need to be measured in order to ascertain the physical parameters of the lens. Therefore, apparatus and methods are needed for measuring a lens formed from a precursor.

SUMMARY

Accordingly, the present invention is directed to methods and apparatus for measuring an ophthalmic lens and in some embodiments, a non-contact optical instrument may be utilized to determine a precise thickness measurement of an ophthalmic lens. Some embodiments additionally include measurement apparatus and methods for measuring an ophthalmic lens in three dimension.

Generally, the present invention includes a confocal displacement sensor and an optic assembly, which in some embodiments, may include a forming optic used as a back curve to form an ophthalmic lens. In some preferred embodiments an optic assembly may be mounted on a kinematic mount which may be fixedly attached to an air bearing rotational stage.

Some embodiments may also include apparatus for adjusting positioning of one or both of a forming optic mandrel holding an ophthalmic lens and a measurement device. For example, in some embodiments, adjustments may be made to the apparatus until a center of rotation for a forming optic assembly and displacement sensor may be aligned, wherein accurate measurements may be taken of a lens and of a forming optic assembly via an adjusted apparatus.

In another aspect, in some embodiments, for example, a displacement sensor may take measurements of a forming optic mandrel not containing a lens. Subsequently, a data file of a forming optic measurement may be utilized as a reference file that may be used to compare with a measurement taken of a forming optic containing a lens. In some embodiments, measurement data obtained may be stored in various embodiments.

In still another aspect, in some embodiments, a forming optic assembly may be mounted upon a kinematic mount and may also be used more than once to form an ophthalmic lens. Subsequently, a measurement may be made of a forming optic assembly containing a lens mounted thereon, and acquired measurement data may subsequently be stored in various embodiments. Comparisons may be made between measurement data descriptive of one or more of a forming optic, an ophthalmic lens, and a forming optic containing an ophthalmic lens thereon.

Other aspects may include, data files comprising measurement information that may later be converted from spherical radial coordinates into one or both of axial coordinates and other spatial indicators. Various data files may be mathematically compared to create an axial thickness file for a measured lens.

BRIEF DESCRIPTION OF THE DRAWINGS

FIG. 2B illustrates a top view of a kinematic mount and a forming optic mandrel.

DETAILED DESCRIPTION OF THE INVENTION

Figure 1:
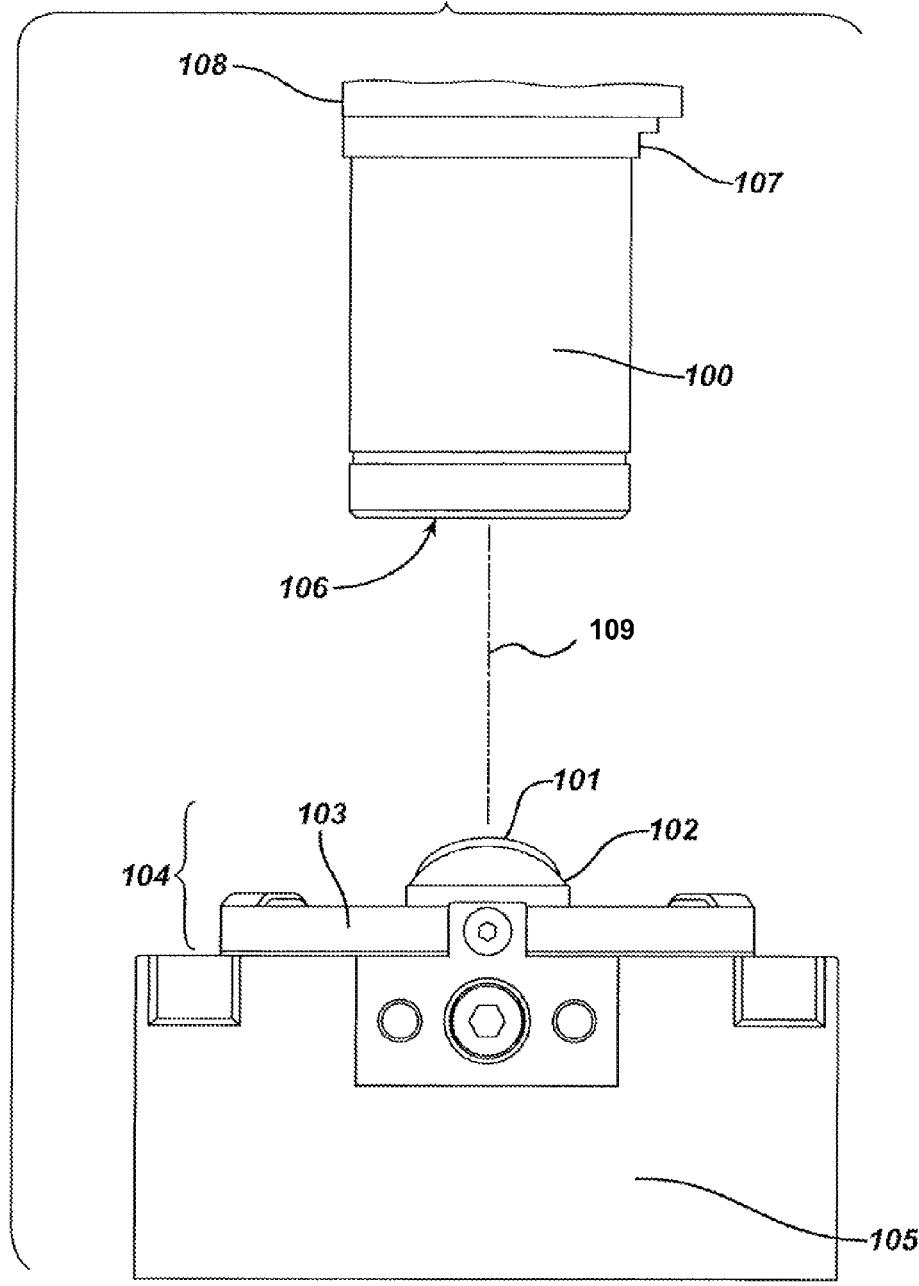
FIG. 1 illustrates a plan view of an ophthalmic lens on a mandrel and a confocal displacement sensor according to some embodiments of the present invention.

The present invention provides for methods and apparatus for measuring a thickness of one or both of a lens and Lens Precursor. In the following sections detailed descriptions of embodiments of the invention will be given. The description of both preferred and alternative embodiments though thorough are exemplary embodiments only, and it is understood to those skilled in the art that variations, modifications and alterations may be apparent. It is therefore to be understood that said exemplary embodiments do not limit the broadness of the aspects of the underlying invention. Method steps described herein are listed in a logical sequence in this discussion. However, this sequence in no way limits the order in which they may be implemented unless specifically stated. In addition, not all of the steps are required to implement the present invention and additional steps may be included in various embodiments of the present invention.

GLOSSARY

In this description and claims directed to the presented invention, various terms may be used, in which event, the following definitions will apply:

"Actinic Radiation" as used herein, refers to radiation that is capable of initiating a chemical reaction, such as, for example, polymerization of a Reactive Mixture.

"Arcuate" as used herein, refers to a curve or bend like a bow.

"Beer's Law" as referred to herein and sometimes referred to as "Beers-Lambert Law" is: $I(x)/I0=\exp(-cx)$, wherein $I(x)$ is the intensity as a function of distance x from the irradiated surface, I0 is the incident intensity at the surface, is the absorption coefficient of the absorbing component, and c is the concentration of the absorbing component.

"Collimate" as used herein means to limit the cone angle of radiation, such as light radiation that proceeds as output from an apparatus receiving radiation as an input; in some embodiments the cone angle may be limited such that proceeding light rays are parallel. Accordingly, a "collimator" includes an apparatus that performs this function and "collimated" describes the effect on radiation.

"DMD" as used herein, a digital micromirror device is a bistable spatial light modulator consisting of an array of movable micromirrors functionally mounted over a CMOS SRAM. Each mirror is independently controlled by loading data into the memory cell below the mirror to steer reflected light, spatially mapping a pixel of video data to a pixel on a display. The data electrostatically controls the mirror's tilt angle in a binary fashion, where the mirror states are either +X degrees (on) or –X degrees (off). For current devices, X may be either 10 degrees or 12 degrees (nominal). Light reflected by the on mirrors then is passed through a projection lens and onto a screen. Light is reflected off to create a dark field, and defines the black-level floor for the image. Images are created by gray-scale modulation between on and off levels at a rate fast enough to be integrated by the observer. The DMD (digital micromirror device) is sometimes DLP projection systems.

"DMD Script" as used herein shall refer to a control protocol for a spatial light modulator and also to the control signals of any system component, such as, for example, a light source or filter wheel either of which may include a series of command sequences in time. Use of the acronym DMD is not meant to limit the use of this term to any one particular type or size of spatial light modulator.

"Fixing Radiation" as used herein, refers to Actinic Radiation sufficient to one or more of: polymerize and crosslink, essentially all Reactive Mixture comprising a Lens Precursor or lens.

"Fluent Lens Reactive Media" as used herein means a Reactive Mixture that is flowable in either its native form, reacted form, or partially reacted form and, a portion or all Reactive Media may be formed upon further processing into a part of an ophthalmic lens.

"Free-form" as used herein "free-formed" or "free-form" refers to a surface that is formed by crosslinking of a Reactive Mixture and is not shaped according to a cast mold, lathe, or laser ablation.

"Gel Point" as used herein shall refer to the point at which a gel or insoluble fraction is first observed. Gel point is the extent of conversion at which a liquid polymerization mixture becomes a solid.

"Lens" as used herein "lens" refers to any ophthalmic device that resides in or on the eye. These devices may provide optical correction or may be cosmetic. For example, the term lens may refer to a contact lens, intraocular lens, overlay lens, ocular insert, optical insert or other similar device through which vision is corrected or modified, or through which eye physiology is cosmetically enhanced (e.g. iris color) without impeding vision. In some embodiments, the preferred lenses of the invention are soft contact lenses are made from silicone elastomers or hydrogels, which include but are not limited to silicone hydrogels, and fluorohydrogels.

"Lens Precursor" as used herein, means a composite object consisting of a Lens Precursor Form and a Fluent Lens Reactive Mixture in contact with the Lens Precursor Form. For example, in some embodiments Fluent Lens Reactive Media is formed in the course of producing a Lens Precursor Form within a volume of Reactive Mixture. Separating the Lens Precursor Form and adhered Fluent Lens Reactive Media from a volume of Reactive Mixture used to produce the Lens Precursor Form may generate a Lens Precursor. Additionally, a Lens Precursor may be converted to a different entity by either the removal of significant amounts of Fluent Lens Reactive Mixture or the conversion of a significant amount of Fluent Lens Reactive Media into non-fluent, incorporated material.

"Lens Precursor Form" as used herein, means a non-fluent object with at least one optical quality surface which is consistent with being incorporated, upon further processing, into an ophthalmic lens.

"Lens Forming Mixture" as used herein, the term or "Reactive Mixture" or "RMM" (reactive monomer mixture) refers to a monomer or prepolymer material which may be crosslinked to form an ophthalmic lens. Various embodiments may include lens forming mixtures with one or more additives such as: UV blockers, tints, photoinitiators or catalysts, and other additives one might desire in an ophthalmic lenses such as, contact or intraocular lenses.

"Mold" as used herein, refers to a rigid or semi-rigid object that may be used to form lenses from uncured formulations. Some preferred molds include two mold parts forming a front curve mold part and a back curve mold part.

"Radiation Absorbing Component" as used herein, the term "refers to radiation-absorbing component which may be combined in a reactive monomer mix formulation and which may absorb radiation in a specific wavelength range.

Reactive Mixture (also sometimes referred to herein as: Lens Forming Mixture or Reactive Monomer Mixture and with same meaning as "Lens Forming Mixture").

"Release from a mold" as used herein, "release from a mold," means that a lens becomes either completely separated from the mold, or is only loosely attached so that it may be removed with mild agitation or pushed off with a swab.

"Stereolithographic Lens Precursor" as used herein means a Lens Precursor where the Lens Precursor Form has been formed by use of a stereolithographic technique.

"Substrate" as used herein means a physical entity upon which other entities are placed or formed, sometimes referred to herein as Substrate or a Mandrel.

"Transient Lens Reactive Media" as used herein means a Reactive Mixture that remains on a Lens Precursor Form and is not fully polymerized and may remain in fluent or non-fluent form. Transient Lens Reactive Media is significantly removed by one or more of: cleaning, solvating and hydration steps before it becomes incorporated into an ophthalmic lens. Therefore, for clarity, the combination of a Lens Precursor Form and the transient lens Reactive Mixture does not constitute a Lens Precursor.

"Voxel" as used herein "Voxel" or "Actinic Radiation Voxel" is a volume element, representing a value on a regular grid in three dimensional space. A Voxel may be viewed as a three dimensional pixel, however, wherein a pixel represents 2D image data a Voxel includes a third dimension. In addition, wherein Voxels are frequently used in the visualization and analysis of medical and scientific data, in the present invention, a Voxel is used to define the boundaries of an amount of actinic radiation reaching a particular volume of Reactive Mixture, thereby controlling the rate of crosslinking or polymerization of that specific volume of Reactive Mixture. By way of example, Voxels are considered in the present invention as existing in a single layer conformal to a 2-D mold surface wherein the Actinic Radiation may be directed normal to the 2-D surface and in a common axial dimension of each Voxel. As an example, specific volume of Reactive Mixture may be crosslinked or polymerized according to 768× 768 Voxels.

"Voxel-based Lens Precursor" as used herein "Voxel-based Lens Precursor" means a Lens Precursor where the Lens Precursor Form has been formed by use of a Voxel-based lithographic technique.

"Xgel" as used herein, Xgel is the extent of chemical conversion of a crosslinkable Reactive Mixture at which the gel fraction becomes greater than zero.

"Mandrel" as used herein, includes an article with a shaped surface for securing an ophthalmic lens.

Referring now to FIG. 1, illustrates a plan view of an ophthalmic lens 101 on a forming optic mandrel 102 and a confocal displacement sensor 100 according to some embodiments of the present invention. In some embodiments, a displacement sensor 100 may include one or more of an objective lens 106, a laser beam source 107 and a camera 108. In some additional embodiments, through a center optic portion of an objective lens 106 a laser beam 109 may be focused onto a targeted surface. In some other embodiments, an objective lens 106 may oscillate up and down changing a laser beam 109 focal point until a camera 108 determines at which position an objective lens 106 may obtain a sharp focus. Additionally, in some embodiments, a laser beam 109 may be reflected off a surface onto a camera 108, wherein a target height of a displacement sensor 100 may be determined.

Furthermore, in some embodiments, a displacement sensor 100 may compute displacement of a surface. In some preferred embodiments, for example, a displacement sensor 100 may have an operating range of 30 mm and may measure thickness from plus 1 mm to minus 1 mm, while maintaining adequate displacement accuracy. For exemplary purposes, in some embodiments a displacement sensor 100 may include model Keyence LT-9030M (Japan) or any other displacement sensor known to those in the art.

As illustrated in FIG. 1 a forming optic mandrel 102 may be used to form a back curve of a lens 101. In some embodiments, a forming optic mandrel 102 may sit on a metal frame 103, together comprising a forming optic assembly 104. In some other embodiments, a kinematic mounting device 105 may fasten a forming optic assembly 104 in place. For those skilled in the art, a kinematic mount 105 may be defined as a mechanism for mounting an object in a fixed position relative to another. In some embodiments, utilizing a kinematic mount 105 and a mounting technique for implementing the same, may allow for a forming optic assembly 104 to maintain a precise position each time a forming optic assembly 104 may be mounted upon a kinematic mount 105. Furthermore, in some embodiments, with respect to where a displacement sensor 100 may take a reference measurement on a forming optic 102, it may be functionally important for a forming optic assembly 104 to maintain a precise mounting position each time, to obtain accurate measurement data. Accordingly, in some embodiments, for example, a forming optic assembly 104 maintaining a precise position may allow for one or both of formation and measurement of a lens 101 to occur on an exact place of a forming optic 102 each time, and measurement of a forming optic 102 to occur in an exact position each time.

Figure 2A:
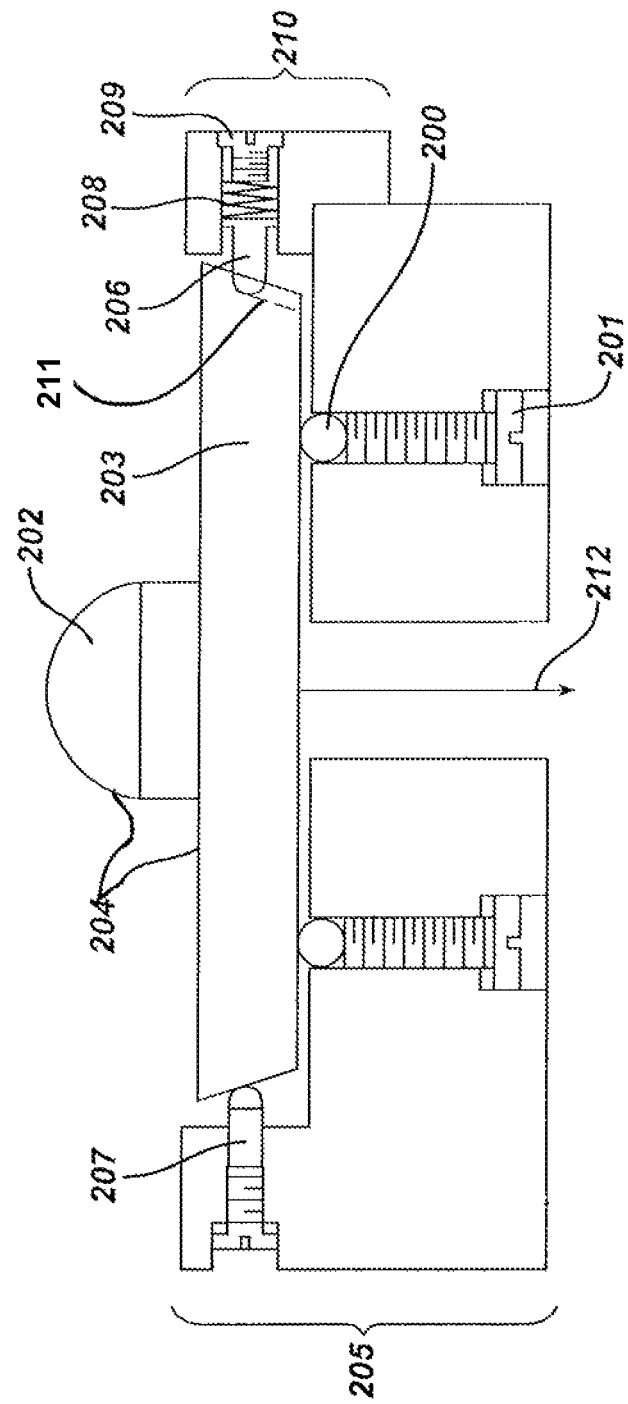
FIG. 2A illustrates a cross section of a kinematic mount and a forming optic assembly.

Referring now to FIGS. 2A and 2B, FIG. 2A illustrates a cross section of a kinematic mount 205 and a forming optic assembly 204 wherein, a forming optic assembly 204 includes both of a forming optic mandrel 202 and a metal frame 203. FIG. 2B illustrates a top view of a kinematic mount 205 and a forming optic mandrel 202. In some embodiments, a top of a plate of a kinematic mount 205 may include one or multiple balls 200 included in a bore. In some additional embodiments, a kinematic mount 205 may include one or multiple screws 201 that may aid in adjusting a ball 200 height until a ball 200 may touch a forming optic assembly 204 at a single point whereby, a forming optic assembly 204 may be leveled on a forming optic rotation axis.

Furthermore, in some other embodiments, a kinematic mount 205 may include one or more of adjuster ball pins 207 and a plunger 206 that may aid in securing a kinematic mount 205 in place. Accordingly, in some embodiments, a spring pin assembly 210 may include one or more of a plunger 206 that may ride in a groove, a spring 208 that may sit behind a plunger 206, and a spring pin assembly screw 209 that may captivate a spring 208.

In some aspects of this invention, a plunger 206 may move in and out freely, wherein a plunger 206 may engage a forming optic assembly 204 into a position by pushing itself into a notch 211. More specifically, in some embodiments, for example, a notch 211 may secure a forming optic assembly 204 to remain clocked in a right angle as a spring 208 may push a plunger 206 into a notch 211. In some additional embodiments, a spring pin assembly 210 via a plunger 206, may push a forming optic assembly 204 in a certain direction (e.g., left or right) wherein, an edge of a forming optic assembly 204 may impinge on one or both adjuster ball pins 207. Furthermore, in some embodiments, adjusting an adjuster ball pin 207 may allow adjustment of an entire X, Y position of a forming optic assembly 204.

In another aspect, a negative atmospheric pressure pump may be used to supply negative atmospheric pressure, or vacuum pressure 212 to a space between a forming optic assembly 204 and a kinematic mount 205 through a forming optic rotation axis. In some embodiments, for example, a vacuum may be used to releasably secure a forming optic assembly 204 down onto one or more balls 200 but not, however, so that one or both of a spring 208 and a plunger 206 may be inhibited from pushing a forming optic assembly 204 against one or both adjuster ball pins 207.

Figure 3A:
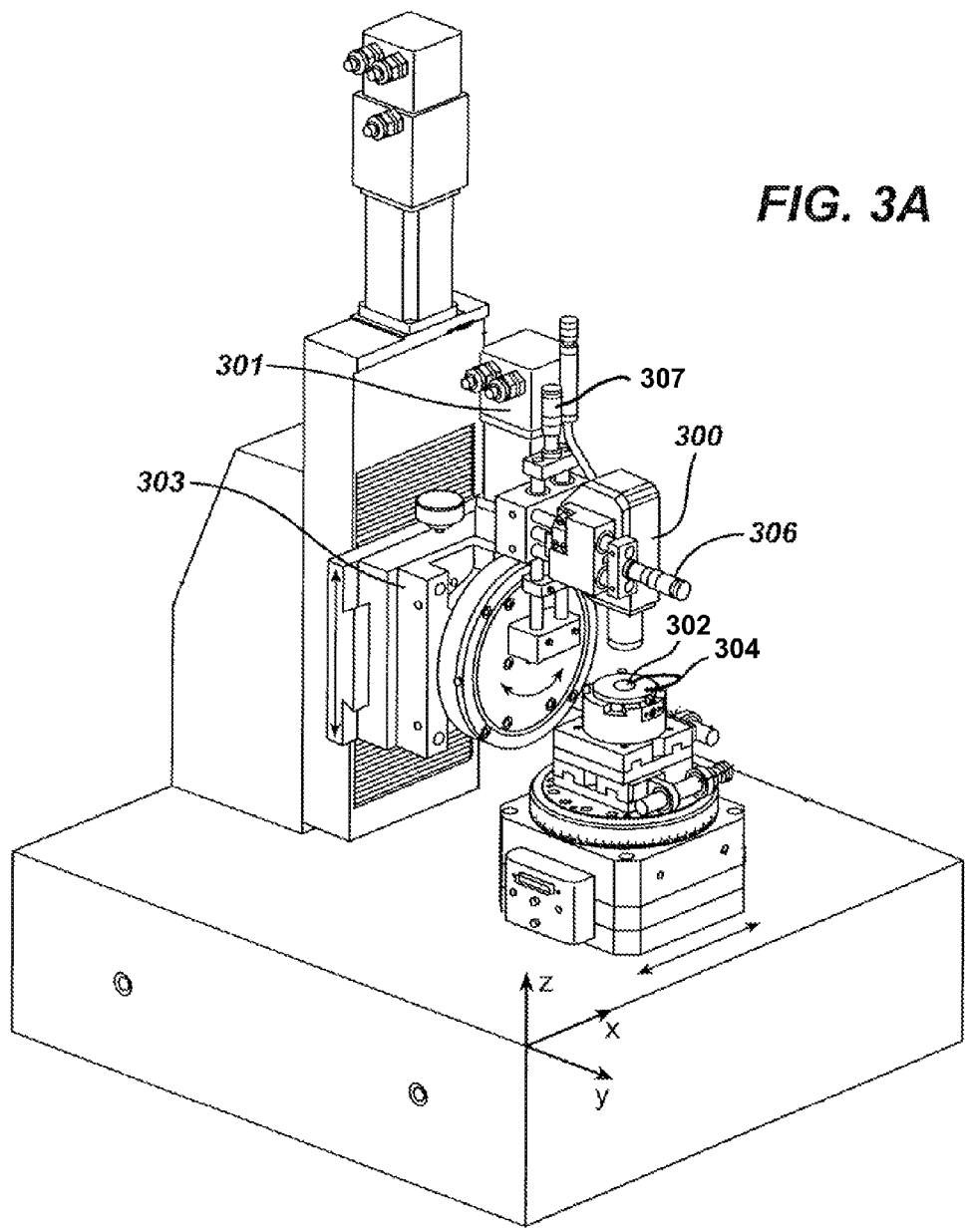
FIG. 3A illustrates a side view of a metrology apparatus including a sensor rotation axis and multiple displacement sensor adjusters.
Figure 3B:
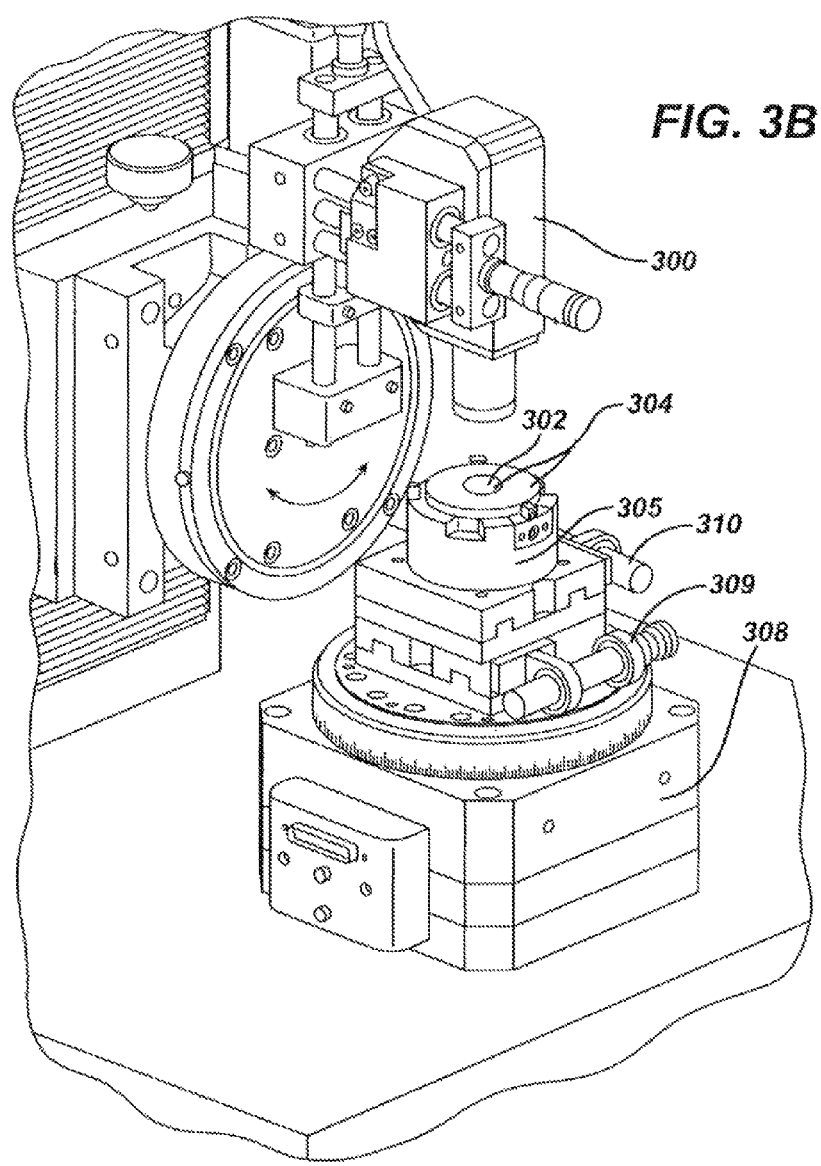
FIG. 3B illustrates a closer-up side view of a metrology apparatus including a forming optic rotation axis and multiple forming optic adjusters.

Referring now to FIGS. 3A and 3B, FIG. 3A illustrates a side view of a metrology apparatus including a sensor rotation axis 301 and multiple displacement sensor 300 adjusters. FIG. 3B illustrates a closer-up side view of a metrology apparatus including a forming optic rotation axis 308 and multiple forming optic 302 adjusters. In some embodiments, for example, a sensor 300 may rotate via a sensor rotation axis 301 and a forming optic assembly 304 mounted upon a kinematic mounting device 305, may rotate via a forming optic rotation axis 308 for the full duration of a measurement. For exemplary purposes, a forming optic rotation axis 308 and sensor rotation axis 301 both are state of the art air bearing motorized servo axis', which allows for limited radial run out and axial movement of both axis'. In some preferred embodiments, a displacement sensor 300 and a forming optic mandrel 302 may be aligned wherein a sensor 300 may be centered above a center sphere of a forming optic mandrel 302 during a measurement.

In some embodiments, for example, a displacement sensor 300 may be aligned manually by adjusting one or more of a sensor x adjuster 303, a sensor y adjuster 306, and a sensor z adjuster 307. Accordingly, in some embodiments, a sensor x adjuster 303 may aid in aligning a displacement sensor 300 by allowing movement of a sensor 300 in and out along an x-axis. In some additional embodiments, a sensor y adjuster 306 may aid in aligning a displacement sensor 300 by moving a sensor 300 in and out along a y-axis. Furthermore, in some embodiments, a sensor z adjuster 307 may aid in aligning a displacement sensor 300 by moving a sensor 300 up and down along a z-axis. Additionally, in preferred embodiments, a sensor z adjuster 407 may aid in moving a displacement sensor 300 to a specified working radius, preferably of 30 mm above a forming optic mandrel 302.

In some other embodiments, a forming optic assembly 304 via adjustment of a kinematic mount 305 may be aligned manually by adjusting one or both of a forming optic x adjuster 309 and a forming optic y adjuster 310. In some embodiments, for example, adjustment of one or both of a forming optic x adjuster 309 and forming optic y adjuster 310 may take eccentricity out of a forming optic assembly 304 when mounted upon a forming optic rotation axis 308 wherein, a forming optic 302 may rotate on a center of a forming optic rotation axis 308.

Furthermore, in some additional embodiments, when performing measurements, a displacement sensor 300 may be rotated via a sensor rotation axis 301 to a point of approximately 65 degrees from a position relative to where a sensor 300 may be located when positioned directly above a forming optic mandrel 302. Accordingly, in some embodiments, a displacement sensor's 300 starting angle for taking a measurement may be greater or smaller with respect to one or both of a size of a surface diameter and a size of a surface portion. For example, in some embodiments, a starting angle of a displacement sensor 300 may be smaller for measuring an optic zone of a lens as opposed to measuring a whole lens, and as opposed to measuring a forming optic 302 without a lens.

Accordingly, a forming optic rotation axis 308 may begin to rotate continuously during a measurement. In some embodiments, for example, during a lens measurement, subsequent to one complete rotation of a forming optic rotation axis 308, a displacement sensor 300 may zero itself out on a remaining portion of a forming optic 302 outside of a lens edge. In some further embodiments, a displacement sensor 300 may take a data point measurement in spherical radial coordinates, for every ¼ degree of rotation made of a forming optic rotation axis 308 thereby, collecting a total of 1440 data points per one complete rotation of a rotation axis 308.

In some additional embodiments, for each θ° of rotation of a forming optic rotation axis 308, there may be a value for θ and a value for each ρ angle of a sensor rotation axis 301 wherein, a displacement value may be determined. In some embodiments, for example, Rho values may be calculated such that, evenly incremented axial rings of data may be collected during a measurement wherein, one ring of data may require one rotation of a forming optic assembly 304 followed by a subsequent rotation, as a sensor rotation axis 301 simultaneously moves to a next ρ position. Furthermore, in some aspects, a sensor rotation axis 301 in conjunction with a displacement sensor 300 may move upward to each ρ position wherein, data points may be collected for each axial ring such as, for example, up to 140 axial rings during a measurement.

Figure 4:
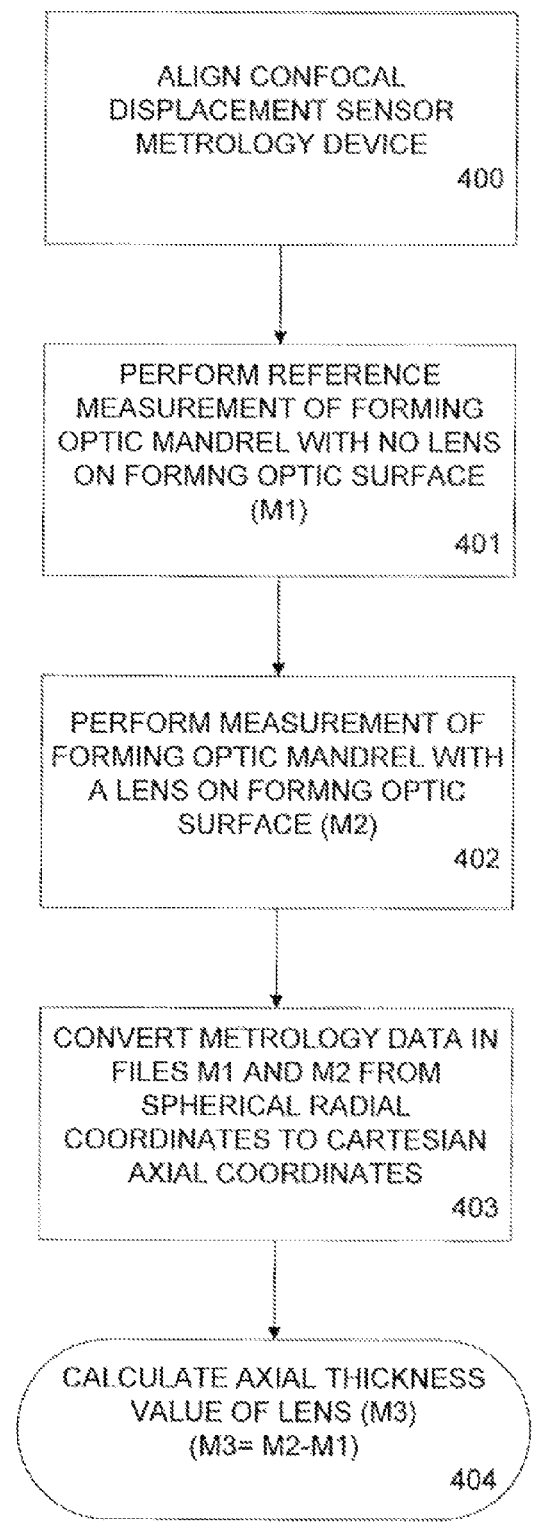
FIG. 4 illustrates method steps according to some additional aspect of the present invention.
Figure 5:
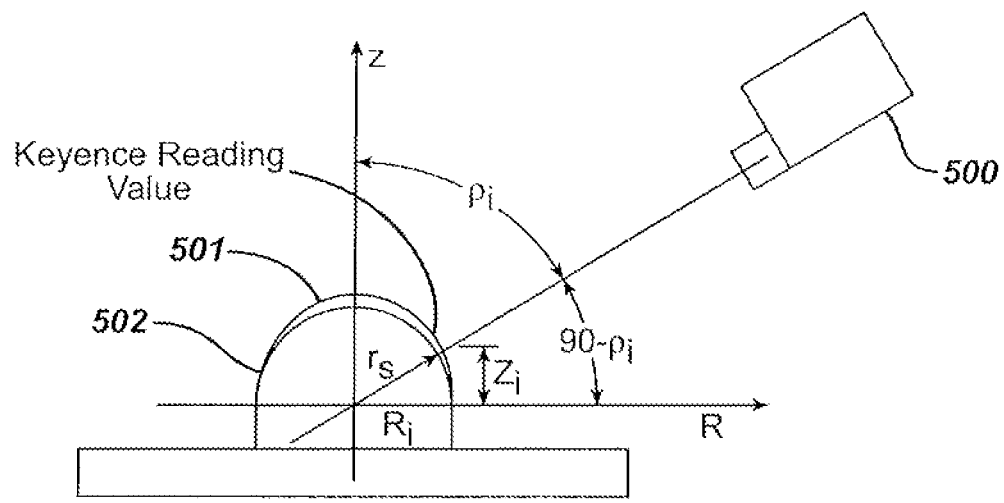
FIGS. 5A and 5B illustrate metrology data represented in spherical radial coordinates.
Figure 5:
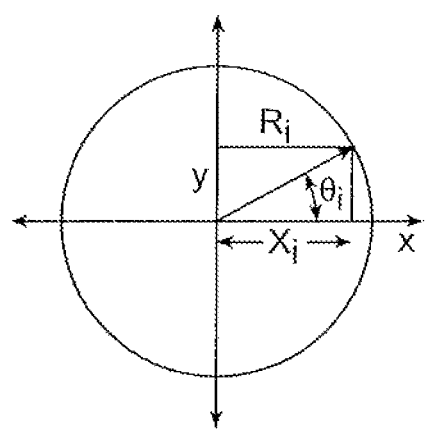

Alternatively, in some additional aspects of the present invention, referring now to FIG. 4, a flowchart illustrates method steps that may be implemented to acquire metrology data and determine an axial thickness of an un-hydrated ophthalmic lens. In some embodiments, an ophthalmic lens may be made and need to be measured to determine whether a lens meets desired specifications. At 400, in some embodiments of the present invention, a metrology apparatus may be aligned, so that a displacement sensor may be directly centered above a center of a forming optic sphere. At 401, a reference measurement may be performed of a forming optic mandrel without a lens on the forming optic's surface (M1). At 402, a measurement may be performed of a lens formed upon a same forming optic (M2) aforementioned at 401, wherein a reference measurement of a forming optic may have been performed. At 403, metrology data acquired from measurements M1 and M2 may be converted from spherical radial coordinates into Cartesian coordinates (refer to FIG. 5). At 404, a lens axial thickness (M3) value may be calculated wherein a M3 value may be equal to a difference of a M1 metrology data file subtracted from a M2 metrology data file.

Referring now to FIG. 5A and FIG. 5B, FIG. 5A illustrates a displacement sensor 500 performing a measurement of a lens 501 upon a forming optic mandrel 502 wherein, metrology data is represented in spherical radial coordinates. FIG. 5B illustrates a top view of a forming optic mandrel 502 wherein, metrology data is represented in spherical radial coordinates. In some exemplary embodiments, a conversion of spherical radial coordinates recorded may be converted into axial thickness in Cartesian Coordinates, such as X, Y coordinates utilizing one or more of various mathematical calculations. The following represent some exemplary calculations that may be used, wherein:

$R_i$=polar radius
$r_s$=radius of forming optic assembly from independent measurement
key=Keyence sensor reading value $$Sin(90-\rho)=Z/(r_s+\text{key})$$

$$Z=(r_s+\text{key})\sin(90-\rho)$$

$$\text{For } \theta, Z_i=(r_s+\text{key}_i)\sin(90-\rho_i) \quad \text{Equation 1}$$

$$Cos(90-\rho_i)=R_i/r_s+\text{key}_i$$

$$R_i=(r_s+\text{key}_i)(\cos(90-\rho_i)) \quad \text{Equation 2}$$

$$\cos\theta_i=X_i/R_i$$

$$X_i=(r_s+\text{key}_i)(\cos(90-\rho_i))(\cos\theta_i) \quad \text{Equation 3}$$

$$\sin\theta_i=Y_i/R_i$$

$$Y_i=(r_s+\text{key}_i)(\cos(90-\rho_i))(\sin\theta_i) \quad \text{Equation 4}$$

Figure 6:
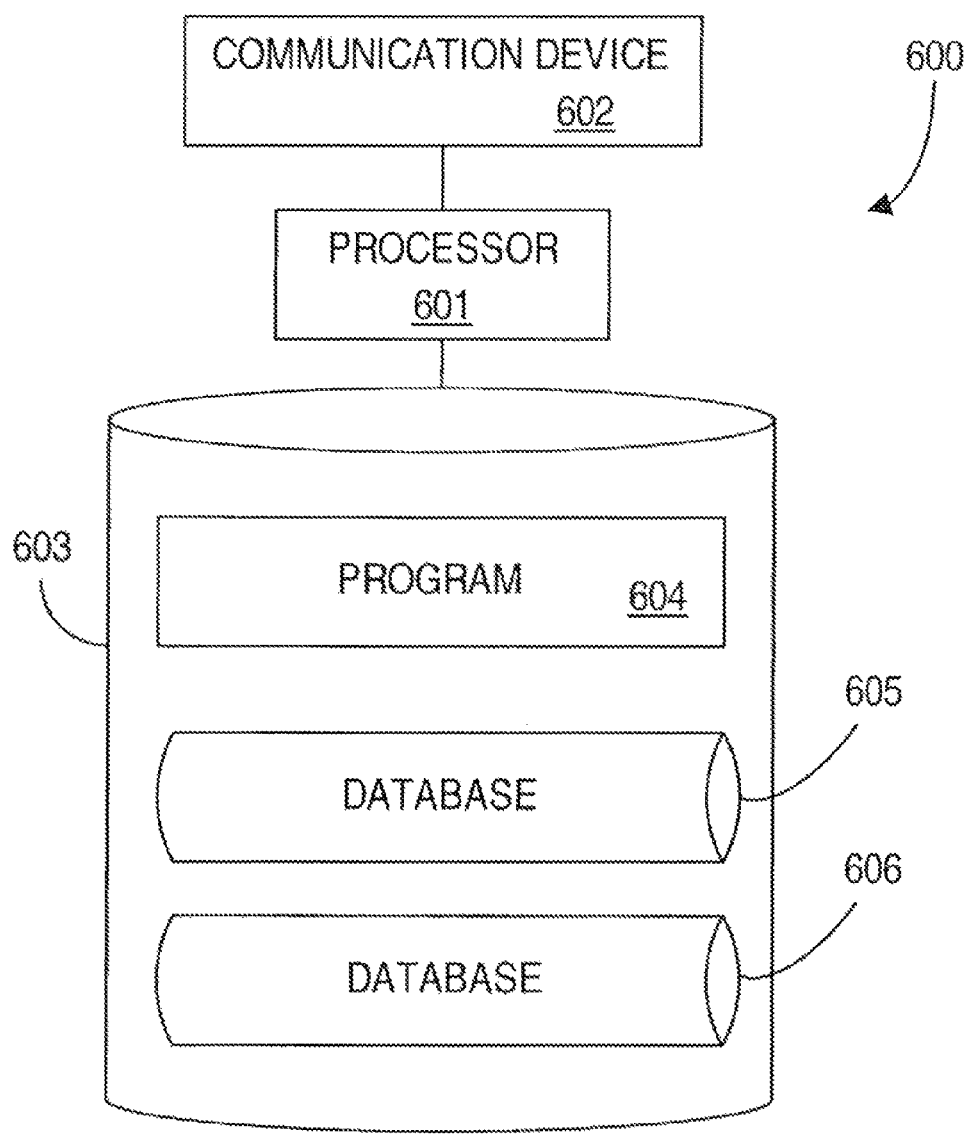
FIG. 6 illustrates a processor that may be used to implement some embodiments of the present invention.

Radial Format:
Three coordinates: θ, ρ, and Keyence reading value+sphere radius
Axial Format:
Three coordinates: X, Y, and Z wherein Z may denote thickness Referring now to FIG. 6, illustrates a controller 600 that may be used to implement some aspects of the present invention. A processor unit 601, which may include one or more processors, coupled to a communication device 602 configured to communicate via a communication network. The communication device 602 may be used to communicate, for example, with one or more controller apparatus or manufacturing equipment components.

A processor 601 may also be used in communication with a storage device 603. A storage device 603 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

A storage device 603 may store an executable software program 604 for controlling a processor 601. A processor 601 performs instructions of a software program 604, and thereby operates in accordance with the present invention such as, for example, the aforementioned method steps. For example, a processor 601 may receive information descriptive of metrology data including a forming optic reference measurement, a lens measurement, and the like. A storage device 603 may also store related data in one or more databases 605 and 606.

CONCLUSION

While the invention has been described with reference to particular embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention.

Therefore, it is intended that the invention not be limited to the particular embodiments disclosed as the best mode contemplated for carrying out this invention, but that the invention will include all embodiments falling within the scope and spirit of the appended claims.

What is claimed is:

1. A method for measuring an un-hydrated ophthalmic lens comprising:
   providing an apparatus for measuring said un-hydrated ophthalmic lens including a displacement sensor having a laser source capable of generating a laser beam, an objective lens for focusing said laser beam, an oscillator for oscillating the objective lens, and a camera for determining a relative sharpness of a focal point of the laser beam;
   positioning a forming optic mandrel having a convex surface in the path of the laser beam;
   obtaining a reference measurement of the shape of the optic mandrel using the apparatus for measuring;
   forming the un-hydrated ophthalmic optic lens on the convex surface of the optic mandrel;
   positioning the forming optic mandrel and formed ophthalmic lens in the path of the laser beam;
   measuring the optic mandrel with the formed ophthalmic lens using the apparatus for measuring; and
   calculating an axial thickness of the ophthalmic lens by comparing the reference measurement to the measurement of the optic mandrel with the formed ophthalmic lens.

2. The method according to claim 1, wherein the measurement steps are performed using spherical coordinates.

3. The method according to claim 2, wherein the spherical coordinates are converted into Cartesian coordinates.

4. The method according to claim 1, wherein the forming step further comprises forming the ophthalmic lens in a free form manner.

5. The method according to claim 4, wherein the forming step further comprises forming the ophthalmic lens by polymerizing a Lens Forming Mixture directly onto the optic mandrel.

6. The method according to claim 5, wherein the Lens Forming Mixture is polymerized using actinic radiation.

* * * * *